United States Patent [19]
Gumbiowski et al.

[11] Patent Number: 6,020,286
[45] Date of Patent: Feb. 1, 2000

[54] DYE-RECEIVING ELEMENT FOR THERMAL DYE TRANSFER

[75] Inventors: Rainer Gumbiowski, Wallenhorst; Jürgen Graumann, Osnabrück; Dieter Becker, Georgsmarienhütte, all of Germany

[73] Assignee: Felix Schoeller jr. Foto- und Specialpapiere GmbH & Co. KG, Osnabuck, Germany

[21] Appl. No.: 08/889,832

[22] Filed: Jul. 10, 1997

[30] Foreign Application Priority Data

Jul. 17, 1996 [DE] Germany ................. 196 28 800

[51] Int. Cl.$^7$ .............................. B41M 5/035; B41M 5/38
[52] U.S. Cl. ................... 503/227; 428/211; 428/304.4; 428/342; 428/513; 428/913; 428/914
[58] Field of Search ................ 8/471; 428/195, 428/211, 212, 304.4, 913, 914, 342, 513; 503/227

[56] References Cited

U.S. PATENT DOCUMENTS

| | | | |
|---|---|---|---|
| 4,999,335 | 3/1991 | Mruk et al. ........................... | 503/227 |
| 5,059,580 | 10/1991 | Shibata et al. ....................... | 503/227 |
| 5,143,904 | 9/1992 | Minato et al. ........................ | 503/227 |
| 5,350,733 | 9/1994 | Campbell et al. .................... | 503/227 |
| 5,387,574 | 2/1995 | Campbell et al. .................... | 503/227 |
| 5,451,561 | 9/1995 | Campbell et al. .................... | 503/227 |

FOREIGN PATENT DOCUMENTS

| | | | |
|---|---|---|---|
| 0409555 | 1/1991 | European Pat. Off. ............... | 503/227 |
| 0551894 | 7/1993 | European Pat. Off. . | |
| 4302210 | 7/1993 | Germany . | |

OTHER PUBLICATIONS

JP 5–184 759A, lecture in Patent Abstracts of Japan, M–1508, Oct. 11, 1993, vol. 17, No. 610.

Scott, W.E., "Properties of Paper, An Introduction" 1989; Tappi Press, Atlanta, GA; p. 42.

*Primary Examiner*—Bruce H. Hess
*Attorney, Agent, or Firm*—Cook, Alex, McFarren, Manzo, Cummings & Mehler, Ltd.

[57] ABSTRACT

In a dye-receiving element for thermal dye transfer, with a substrate, a composite foil and a dye-receiving layer, the composite foil contains a thermoplastic core layer exhibiting micropores and, on the side facing the receiving layer, at least two pore-free thermoplastic surface layers, and the substrate is a paper with a density of $\leq 0.8$ g/cm$^3$.

16 Claims, No Drawings

DYE-RECEIVING ELEMENT FOR THERMAL DYE TRANSFER

FIELD OF THE INVENTION

The invention concerns a dye-receiving element for thermal dye transfer, which comprises a substrate, a composite foil and a color-receiving layer.

BACKGROUND OF THE INVENTION

The methods for thermal dye transfer developed in the past few years permit the reproduction of an electronically generated image in the form of "hard copy". The principle of such a process is as follows:

A digital image is prepared with the primary colors cyan, magenta, yellow and black and converted into corresponding electrical signals which are then converted into heat by means of a thermal head. Under the action of heat, the dye sublimates from the donor layer of a dye ribbon (color sheet) in contact with the receiving material and diffuses into the receiving layer.

The aim of this technology is to bring the image quality of color prints to the level of silver-salt photography.

To achieve images of high quality with regard to optical density, color tone and resolution, a further requirement must be imposed upon the receiving element in addition to a smooth surface, heat stability, photostability, good dye solubility and "antiblocking" properties, namely, a so-called softness. This property is necessary to produce good contact between the thermal head of the printer and the receiving material. If this is not achieved, unprinted areas or density fluctuations may be observed on the image surface.

The curling behavior of the receiving material represents a further problem. The receiving materials often tend to assume a pronounced curvature after a pass through the thermal printer, which is also retained over the course of time.

The problem of softness can be solved, for example, by the use of an intermediate layer performing the function of a padded layer. Known from JP 02/274,592 is the insertion of an intermediate layer of foamed polypropylene between substrate material and receiving layer.

The same problem is supposed to be solved in JP 03/268,998 by the application of foamed polyolefin layers to both sides of the substrate.

Known from EP 0,551,894 is the application of a composite foil to a substrate, which contains a porous core layer and at least one surface layer which is free of pores.

SUMMARY OF THE INVENTION

The problem of the present invention is to propose a dye-receiving element for thermal dye transfer, which exhibits a slight curl, high color density and a uniform image appearance.

This problem is solved by a dye-receiving element which contains a substrate, a composite foil and a dye-receiving element, the composite foil being a biaxially stretched, coextruded foil which contains a thermoplastic core layer exhibiting micropores and, on the side facing the receiving layer, at least two pore-free thermoplastic surface layers and the substrate is a low-density paper.

DETAILED DESCRIPTION OF THE INVENTION

According to the preferred embodiment of the invention, the composite foil also exhibits at least one pore-free thermoplastic surface layer on the side facing the substrate. It was found, surprisingly, that two pore-free layers smooth out the irregularities of the core layer exhibiting micropores very much better than a single layer with the same thickness. The result is a better image with less "mottle". A single layer of greater thickness which compensates the irregularities of the layer having micropores in the same way would impair the compressibility of the element.

This two-layer structure with two thin layers on the core layer impairs neither the heat-insulating behavior of the core layer exhibiting micropores nor the compressibility of the element, which is responsible for good contact.

The total thickness of the foil can amount to 40 $\mu$m, but especially from 25 to 35 $\mu$m. The porous core layer comprises from 85 to 93% of the total thickness of the composite foil.

In a special development of the invention, the core layer exhibiting micropores is a polyolefin layer, especially a polypropylene layer. Of the at least two pore-free thermoplastic surface layers, arranged on the side of the receiving layer facing the core layer, the outer layer consists preferably entirely or in part of a polypropylene copolymer.

A polyethylene/polypropylene copolymer is particularly suitable for this purpose. The surface layer, directly contacted by the at least two pore-free layers with the core layer, is a layer consisting preferably of polypropylene homopolymer, entirely or in part.

Both the core layer as well as the surface layer can be produced from other thermoplastic polymers, such as polyesters, and other polyolefins, such as polyethylenes, ethylene/$\alpha$-olefin polymers as well as their mixtures.

The invented substrate is a substrate with little density. Found to be particularly suitable is an uncoated or resin-coated, especially a polyolefin-coated raw paper with a density of $\leq 0.8$ g/cm$^3$. The paper contains a mixture of conifer sulfate and/or sulfite cellulose and hardwood cellulose. In a special development of the invention, the mixture contains a conifer sulfate cellulose and eucalyptus cellulose. In a preferred form, the conifer sulfate cellulose is a sulfate cellulose from pine. The share of conifer sulfate cellulose in the cellulose total amounts to from 5 to 80% by weight, especially to from 10 to 40% by weight. All products commonly employed in the paper industry can be used as an agent for sizing and imparting wet strength. Inorganic pigments, such as calcium carbonate, clay, titanium oxide and silicates can be added to increase the whiteness and opacity of the paper. But it is also possible to add other auxiliary agents.

An especially high dimensional stability is exhibited by a paper in which the orientation of the fibers in the lengthwise and crosswise directions is chosen in such a way that a lengthwise/crosswise ratio of $\leq 2$ results for tearing length and bending stiffness.

In a special development of the invention, the paper exhibits a crosswise wet expansion according to Fenchel of $\leq 3\%$, especially of $\leq 2\%$. The surface weight of the paper can amount to from 60 to 250 g/m$^2$. Preferred, however, is a paper with a surface weight of from 80 to 160 g/m$^2$.

In a special development of the invention, the back side of the substrate exhibits a polyolefin layer with an application weight of up to 50 g/m$^2$, preferably from 20 to 35 g/m$^2$.

In a further development of the invention, a polymeric adhesive layer is inserted between the substrate and the composite foil. The polymers suitable for the adhesive layer are, for example, ethylene/vinyl acetate copolymer, polyacrylates, acrylate copolymers, polyolefins, ionomeric resins or polyurethanes.

Especially suitable for this purpose are polyurethanes, applied either as a two-component system with organic solvents or as a self cross-linking single-component system. The application weight of the adhesive layer amounts maximally to 6 g/m².

In a further development of the invention, the invented dye-receiving element can contain a layer between the composite foil and the receiving layer. This layer improves the anchoring of the receiving layer on the composite foil. Suitable for this purpose are all adhesion-improving polymers, such as ethylene/vinyl acetate copolymer, polyacrylates, acrylate copolymer, ionomeric resins or polyurethanes, of which the latter are found to be particularly suitable. The application weight amounts maximally to 6 g/m², preferably from 1 to 4 g/m².

This layer promoting adhesion between the receiving layer and the composite foil can be correspondingly dyed, in which case the total receiving element is particularly good for proofing processes (for example, for the analog chromalin or digital proofing processes).

Dyes such as Napronyl® Black EGX, Flexonyl® Yellow NCG-LA and Flexonyl® Red FGR-LA can be used to color the adhesive layer in a quantity of from 0.01 to 1% by weight, relative to the weight of the adhesion-promoting layer.

Per the invention, any desired receiving layer can be used. The main component of the adhesive layer is usually a thermoplastic resin which exhibits an affinity for the dye from the dye ribbon. For this purpose it is possible to use, for example, plastics with ester bonds (polyester, polyacrylic acid ester, polycarbonate, polyvinyl acetate or styrene acrylate resins), plastics with amide bonds as well as mixtures of the listed plastics. But it is also possible to utilize copolymers containing at least one of the structures cited above as the principal component, such as chloride/vinyl acetate copolymer.

According to a further development, the problem underlying the invention can also be solved by a receiving element containing a polyolefin-coated paper substrate and a dye-receiving element, the polyolefin-coated paper substrate being a raw paper coated with polyethylene and/or polypropylene with a density of $\leq 0.8$ g/cm³. Preferred is a paper whose polyolefin layer exhibits a thickness of $\leq 15$ μm, in particular from 8 to 15 μm.

The raw paper contains a mixture of conifer sulfate and/or sulfite cellulose and hardwood cellulose. In a special development of the invention, the conifer sulfate cellulose is pine sulfate cellulose. The share of conifer sulfate cellulose in the total cellulose content amounts to from 5 to 80% by weight, preferably to from 10 to 40% by weight. Any products commonly utilized in the paper industry can be used as the agent for sizing and imparting wet strength. Moreover, inorganic pigments, such as calcium carbonate, clay, titanium oxide or silicates and other auxiliary agents can be used.

Particularly suitable is a paper in which the orientation of the fibers in the lengthwise and crosswise directions is chosen in such a way that a lengthwise/crosswise ratio of $\leq 2$ results for tearing length and bending stiffness.

In a special development of the invention, the paper exhibits a wet expansion, crosswise according to Fenchel, of $\leq 3\%$, preferably $\leq 2\%$. The surface weight of the paper can be from 60 to 250 g/m², preferably from 80 to 160 g/m².

The polyolefin layer can be extruded or coated onto the raw paper with a maximal depth of 15 μm, but in particular from 8 to 15 μm.

The invention shall be explained in detail below by means of examples.

EXAMPLES

Example 1

The following layers were applied to the base paper with a surface weight of 120 g/m² and a density of 0.65 g/cm³, produced from a cellulose suspension containing pine and eucalyptus wood in a ratio of 1:5:

a) Adhesive layer consisting of a polyurethane solution (application weight: 4 g/m²)

b) Composite foil, Trespaphan® SHD 28, from Hoechst AG (28 μm thickness, surface weight: 21.5 g/m²), consisting of:
  a microporous polypropylene core layer,
  two surface layers, free of pores, on one side of the core layer, of which the layer facing the core layer is a pore-free polypropylene layer and the other surface layer is a pore-free polyethylene/polypropylene layer, and
  a pore-free polypropylene surface layer on the other side of the core layer.

c) Receiving layer consisting of a mixture of vinyl chloride/vinyl acetate copolymer and vinyl chloride/acrylic acid methyl ester copolymer, 1:1 (application weight: 6 g/m²), and d) Polyethylene layer on the back side of the substrate, consisting of 60% by weight of LDPE [low-density polyethylene] and 40% by weight of HDPE [high-density polyethylene] (application weight: 30 g/m²).

Example 2

A dye-receiving element prepared per Example 1 was additionally provided with an adhesive layer between the dye-receiving layer and the composite foil. The adhesive layer was applied from a polyurethane dispersion with an application weight of 2 g/m².

Example 3

An image-receiving element was produced per Example 1, except that the composite foil used there was replaced with a different foil. The foil used in this case (35 μm) consisted of the following components:
  microporous polypropylene core layer, and
  two pore-free surface layers on each side of the core layer, in which case the pore-free polypropylene layers facing the core layer are polypropylene layers and the outer surface-layers pore-free ethylene/propylene copolymer layers.

The surface weight of the composite foil is 20.5 g/m².

What is claimed is:

1. A dye-receiving element for thermal dye transfer having a substrate, a composite foil and a dye-receiving layer, and wherein
  the composite foil contains a thermoplastic core layer having micropores and at least two thermoplastic surface layers on the side facing the receiving layer, and
  the substrate is a paper with a density of $\leq 0.8$ g/cm³.

2. The dye-receiving element according to claim 1, wherein the composite foil also includes at least one pore-free thermoplastic surface layer on the side of the substrate facing the core layer.

3. The dye-receiving element according to claim 1, wherein the thickness of the composite foil is a least 40 μm.

4. The dye-receiving element according to claim 3, wherein the thickness of the composite foil is from 25 to 35 μm.

5. The dye-receiving element according to claim 1, wherein the outer one of the surface layers on the side of the receiving layer facing the core layer contains a polypropylene copolymer.

6. The dye-receiving element according to claim 1, wherein the core layer having micropores is a polyolefin layer.

7. The dye-receiving element according to claim 6, wherein said polyolefin is polypropylene.

8. The dye-receiving element according to claim 1, including a pore-free surface layer in direct contact with the core layer, said surface layer containing a polypropylene-homopolymer layer.

9. The dye-receiving element according to claim 1, wherein the substrate is a paper exhibiting a wet expansion of ≦3%.

10. The dye-receiving element according to claim 1, wherein the substrate exhibits a thickness of from 80 to 250 μm.

11. The dye-receiving element according to claim 1, wherein a polyolefin layer is arranged on the back side of the substrate, with an application weight from 20 to 35 g/m$^2$.

12. The dye-receiving element according to claim 1, wherein an adhesive layer is arranged between the substrate and the composite foil.

13. The dye-receiving element according to claim 1, wherein an adhesive layer is arranged between the composite foil and the receiving layer.

14. The dye-receiving element according to claim 1, wherein the paper contains a mixture of conifer sulfate cellulose and hardwood cellulose, and in which the conifer sulfate cellulose is from 10 to 40% by weight of the total cellulose.

15. The dye-receiving element according to claim 1, wherein said paper substrate is coated with a polyolefin.

16. The dye-receiving element according to claim 3, wherein the thickness of the polyolefin is ≦15 μm.

* * * * *